J. T. DEMPSTER.
OSCILLOGRAPH.
APPLICATION FILED APR. 4, 1910.
1,019,432.
Patented Mar. 5, 1912.
3 SHEETS—SHEET 1.
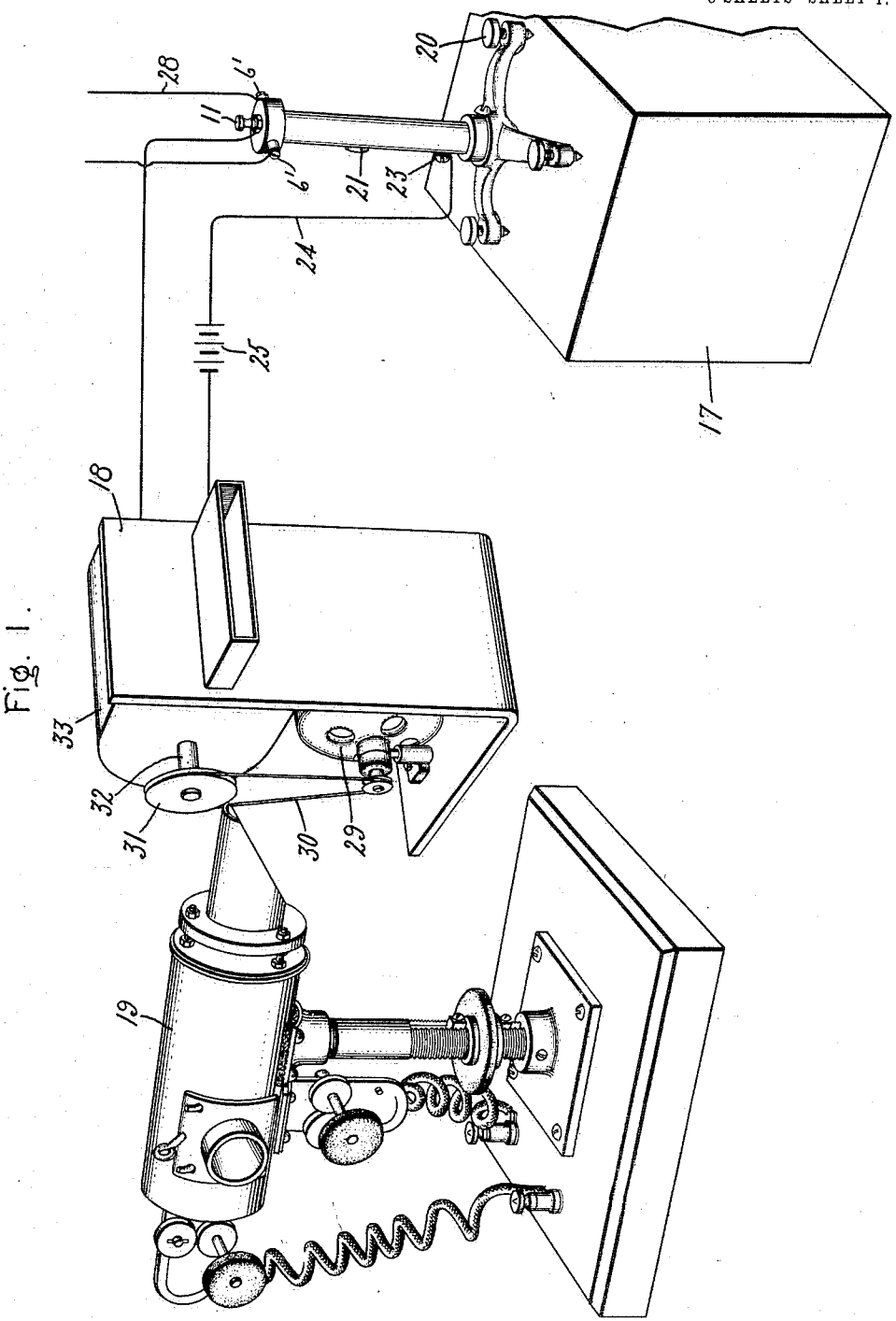
Witnesses:
George W. Tilden
J. Ellis Elen
Inventor:
John T. Dempster,
by
His Attorney.

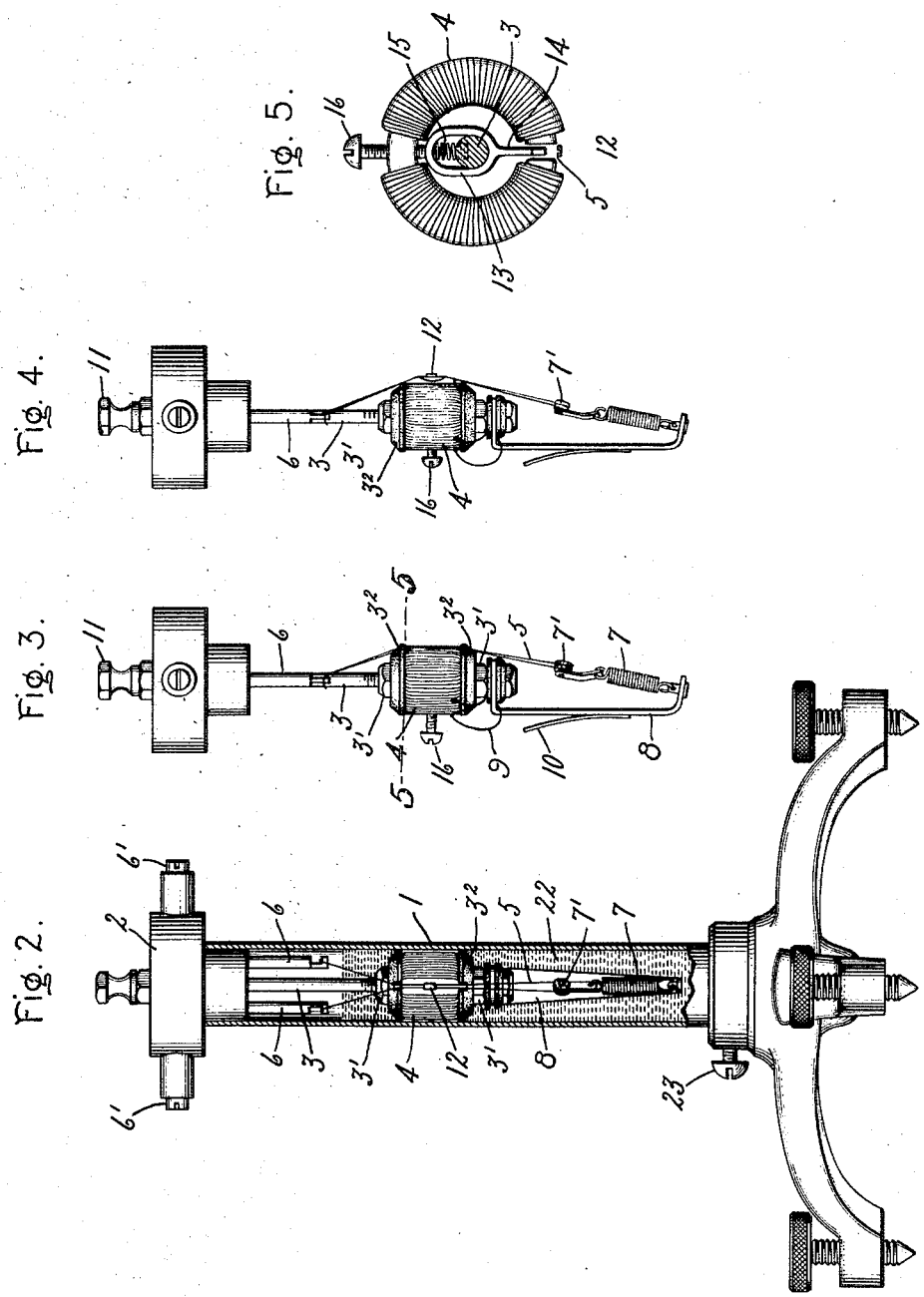

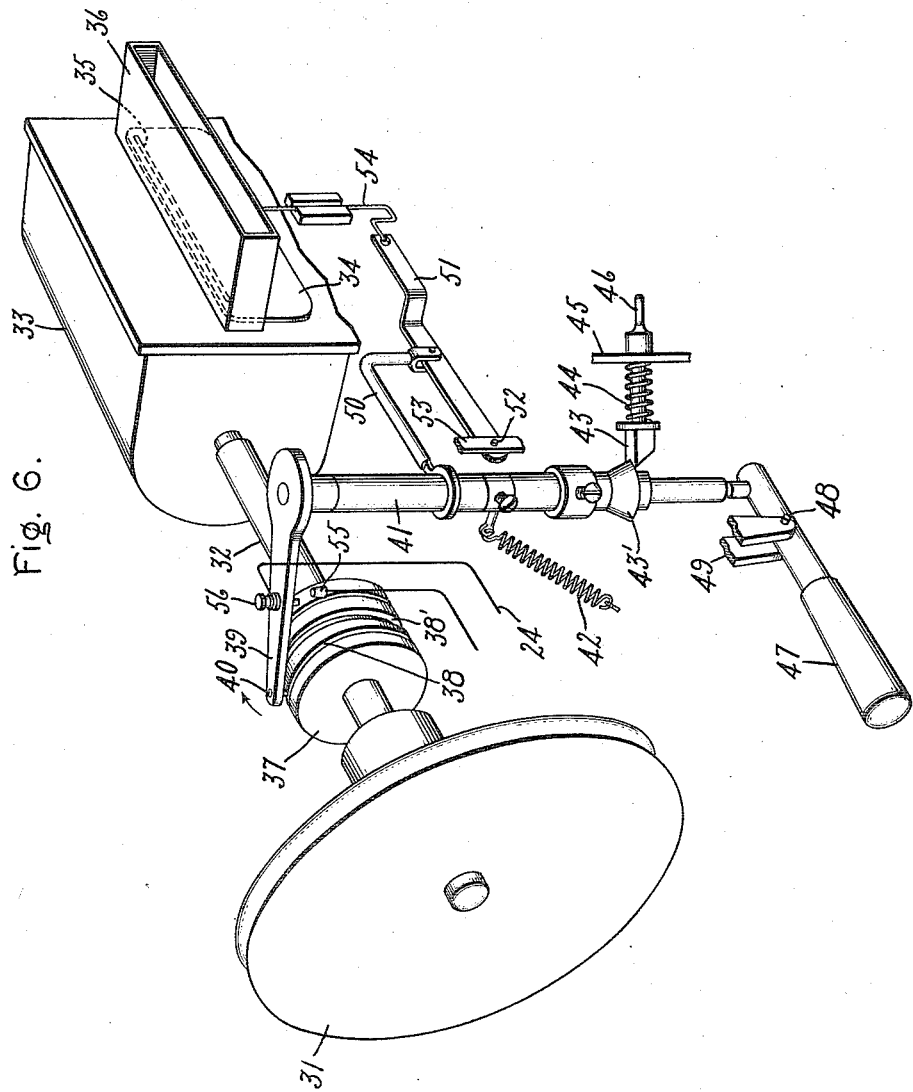

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

OSCILLOGRAPH.

1,019,432.      Specification of Letters Patent.      Patented Mar. 5, 1912.

Application filed April 4, 1910. Serial No. 553,256.

*To all whom it may concern:*

Be it known that I, JOHN T. DEMPSTER, a subject of the King of Great Britain, residing at Schenectady, in the county of Schenectady, State of New York, have invented certain new and useful Improvements in Oscillographs, of which the following is a specification.

My invention relates to oscillographs, and has for its object an improvement in such devices.

An oscillograph comprises a galvanometer element whose deflection at any moment is proportional to the instantaneous flow of the current in a movable conductor. Such instruments in general consist of a conductor formed as a loop or turn passing through a magnetic field. This conductor is connected to the circuit which it is desired to measure in such a manner that the current will flow in one direction through one side of the conductor and in an opposite direction through the other side of the conductor lying closely adjacent to the first. Owing to the magnetic pull between the conductors and the field, one conductor will be forced in a direction at right angles to its length and to the magnetic field and the other conductor will be forced in the opposite direction. A small mirror is attached to the two conductors, whose movement tends to turn the mirror about an axis parallel to the two conductors. A beam of light may then be used to observe the movement of the mirror in the usual manner. The free periodic time of the mirror and conductor must be short compared to the period of the wave forms being recorded, and means must be used for damping the movement of the mirror, so that it will not be oscillatory. In addition to the galvanometer element, devices for observing or recording the movement of the mirror are provided.

Oscillographs, as built in the past, have been cumbersome and heavy mechanisms, complicated in structure and difficult to transport.

The object of my invention is the construction of an oscillograph which shall be simple, light, readily transportable and accurate. I accomplish the object of my invention by the use of a small and powerful electromagnet, by a special device for displacing relatively the magnet and the mirror so as to render the mirror accessible in case it has to be renewed, and by a special arrangement of the energizing circuit of the electromagnet, so that it shall be energized only when the indications of the mirror are being obtained.

The further novelties of my invention are pointed out with more particularity in the claims annexed to and forming a part of this specification.

For a further understanding of my invention, reference may be had to the accompanying drawings, where—

Figure 1 shows in perspective the general arrangement of apparatus which I employ, some of the details being omitted; Fig. 2 shows a vertical view, partly in section, of the galvanometer and its containing vessel; Fig. 3 is a vertical side view of the magnet and conductor, with the latter in its normal position; Fig. 4 is a vertical view, similar to Fig. 3, showing the conductor and mirror pushed away from the magnet in order to render the mirror accessible; Fig. 5 is a sectional view taken on line 5—5 of Fig. 3 and looking downward therefrom, certain details of the conductor and magnet suspension being omitted, and Fig. 6 is a view in perspective on a larger scale of certain details of the recording mechanism.

Referring first to Fig. 2, 1 is a containing vessel or tube, which may be formed of metal, having a removable cover 2, to which is attached a support 3 for the ring-shaped electromagnet 4. This magnet may be held to the support by nuts $3^1$ and washers $3^2$ as shown, or in any suitable manner. 5 is a looped conductor formed in the usual manner, its upper ends being attached to supports 6 which are electrically connected to terminals 6′ fastened to the cover. 7 is a spring for resiliently supporting the looped conductor which normally rests against washers $3^2$, small grooves being cut therein as shown in Fig. 2. The looped portion of the conductor passes around block 7′. This spring is fastened to a support 8 which is attached to the magnet support. One end 9 of the winding of the electromagnet is connected to supporting member 8, which is insulated from support 3. To support 8 is fastened a spring conducting member 10, which is adapted to engage the side of tube 1 and make contact therewith when the cover is inserted in the tube. The other end of the winding of magnet 4 makes contact with support 3, which is in electrical contact with terminal 11. Secured to the looped conductor is a mirror 12, and the conductor is so arranged that it passes through the field of the magnet in the usual manner.

Referring to Fig. 5, the conductor and magnet are shown in the normal position. Surrounding the support 3 is shown a collar 13, which has a projection 14 adapted to push the conductor and mirror away from the magnet, as is shown better in Fig. 4, in order to make the mirror accessible in case it has to be replaced or adjusted. The collar and projection are normally held out of engagement with the conductor by spring 15, which presses against support 3. Screw 16 is threaded into the magnet and has its end pressing against the collar, so that when the screw is turned it will press the collar and projection against the action of the spring and thus relatively displace laterally or push the conductor and mirror away from the magnet. Terminals 6' are connected to the circuit to be measured, and the current will then flow downward in one side of the conductor and upward in the other, and the magnetic pull between the two conductors and the field of the magnet will cause the mirror to turn in a horizontal direction, the extent of its movement being proportional to the amount of current flowing in the conductor.

Referring now to Fig. 1, the galvanometer element of the oscillograph is shown as supported on any suitable pedestal 17. 18 is a device of any suitable character for obtaining the indications of the galvanometer mirror, and this device may be either arranged to obtain photographic indications or visual indications upon a ground glass screen, etc. I have shown the indicating device as arranged to obtain photographic indications, or indications on a film in the manner which is well understood, and the general arrangements for obtaining such indications do not form a portion of my invention. 19 is a suitable lamp for directing a beam of light upon the mirror to obtain the indications by means of device 18, and also does not form a portion of my invention. The tube 1 is mounted on suitable leveling screws 20, in order to adjust the position of the tube and hence of the mirror with reference to the indicating device 18 in the manner which will be well understood by those skilled in the art. Tube 1 has a window 21 covered with glass opposite the mirror for allowing the beam of light to impinge against the mirror and be reflected therefrom. The tube is filled with suitable damping liquid 22 for damping the oscillations of the conductor and the mirror. Terminal 23 is in electrical contact with the tube, and connected to this terminal and terminal 11 is a circuit 24 including a source of energy 25 for energizing the winding of the electromagnet. The circuit 24 is not shown completely in Fig. 1; the contacts for completing this circuit are shown more particularly in Fig. 6. The indicating device which I have shown consists in general of a motor 29, which drives by belt 30 a wheel 31 rigidly secured to shaft 32. This shaft passes through a suitable light tight box 33 and revolves a drum upon which the photographic film is attached, the drum, film, etc., not being shown. The details of the mechanism for operating the shutter for allowing the beam of light reflected from the galvanometer mirror are not shown in this figure, but are shown in Fig. 6, to which reference may be made.

Referring now to Fig. 6, 34 is a shutter arranged to have a vertical movement and to open and close a slot 35, which when open permits the exposure of the film to the beam from the mirror in the well understood manner. Surrounding this slot and extending therefrom is a small member 36 for the purpose of allowing the beam from the mirror to be readily adjusted so that it will fall upon the slot 35. Rigidly connected to shaft 32 is a wheel 37 having a groove 38 cut in its surface. This groove is of a helical form and makes about three turns around wheel 37, the center turn 38' being cut deeper than the outside turns for a purpose which will be explained later. In operative relation to this groove is an arm 39 having at its end a pin 40 adapted to engage the groove. Arm 39 is connected to a shaft 41, which is normally strained downward by means of spring 42. This shaft is held against the action of the spring by a catch 43 engaging with a collar 43' upon the shaft, so that pin 40 will be raised clear of groove 38. Catch 43 is normally held in the position shown by spring 44 pressing against an abutment 45, which forms a portion of the frame of the indicating device. Handle 46 is connected to the end of catch 43 for pulling the same outward and permitting the shaft 41 to move in a downward direction.

47 is a small lever pivoted by pin 48 to suitable supports 49, which are fixed and attached to the frame of the indicating device and is in operative relation with shaft 41. This lever is for the purpose of lifting arm 39 and of setting it in its original position after an indication of the movement of the mirror has been obtained. In operative relation with shaft 41 is an arm 50 fastened to the lever 51, which is pivoted by pin 52 to a support 53 attached to the frame of the indicating device. Lever 51, by means of member 54, is attached to shutter 34, so that, when shaft 41 moves vertically downward, shutter 34 will also be moved downward and open slot 35 and thus expose the rotating film. When the shaft is moved upward the shutter will again close the slot.

In coöperative relations are contacts 56 and 55, the one fastened to arm 39 and the other fastened in any suitable manner to the frame of the indicating device, the fastening not being shown to obtain greater clearness of illustration. These contacts are connected with the circuit 24, and are so arranged that when arm 39 and shaft 41 are moved downward, circuit 24 is completed and the magnet of the galvanometer is energized, as may be better seen by referring to Fig. 1.

The method in which this device works is as follows:—The mechanism as shown in the figures is in the position for exposing the film in box 33 to the beam of light reflected from the mirror. Shaft 32 is being constantly revolved by means of the motor 29 in Fig. 1. When it is desired to make an exposure of the film, handle 46 is pulled against the action of spring 44, thus releasing catch 43. Shaft 41, to which arm 39 is attached, is then pulled downward by the action of spring 42, so that pin 40 engages with groove 38. This causes arm 39 to move in the direction shown by the arrow, and, when pin 40 reaches the deep portion of the groove 38', owing to the action of spring 42, shaft 41 will be pulled down still farther, lowering shutter 34 and opening slot 35, so that an exposure will be made on the film, and also contacts 55 will touch each other and complete circuit 24 and thus energize the magnet of the galvanometer. After shaft 32 has made one revolution, during which pin 40 engages with the deep portion of the groove 38'', the groove, becoming shallower, will push up arm 39 and shaft 41 and thus shutter 34, closing slot 35, completing the exposure and opening the energizing circuit of the magnet. Pin 40 engaging the shallow portion of groove 38 shown at the right of the figure, will move arm 39 in the direction of the arrow. Lever 47 may then be operated to raise shaft 41 and cause collar 43' to slip over catch 43, lifting shaft 41 and arm 39 so that pin 40 will be raised out of engagement with groove 38 and permit shaft 32 to revolve without further effect upon the shutter mechanism. When it is desired to turn arm 39 to the original or initial position, small lever 47 is pushed downward and rotated so as to cause pin 40 to pass from the right of wheel 37 to the left in the position shown and the mechanism will be ready for taking another exposure. This mechanism, with the exception of the contact arrangement for completing the energizing circuit of the magnet of the galvanometer is well known and does not form a portion of my invention. The object of this arrangement is that, as the circuit will be completed for only a short time, a much greater current may be used for energizing the winding out of the magnet of the galvanometer without undue heating than could be used if the winding had a current passing through it continuously for a long time, as is commonly done in the manipulation of the present forms of the oscillograph, and thus the winding may be made much smaller proportionately. Conductors 28 are shown as connected to terminals 6' and thus to the looped conductor, these conductors being connected to the circuit which it is desired to measure, and such connections may be made in any of the well known manners and are not illustrated, as they do not form a portion of my invention.

The advantages of my invention are, that by the use of a very small and powerful magnet, which is energized for only the length of time that the indications are being obtained, I am able to make a structure which is very small and compact; by the special device for rendering the mirror accessible I am able to renew the same readily, and I am also able to use my oscillograph with much higher voltage circuits than with the present forms of oscillograph without danger to the operator, as the galvanometer may be mounted on any suitable insulating device, and, after the position of the tube, and hence the mirror, has been adjusted, the operator is only called upon to observe or take the indications by means of device 18 or to adjust the lamp 19, and both indicating device and lamp may be placed at a considerable distance away from the galvanometer and thus the high voltage circuit.

It will be obvious that, while I have only shown and illustrated a single galvanometer, two or more may be used simultaneously with the same indicating device, and thus, for example, the wave forms of current and electromotive force for a circuit may be obtained simultaneously, as is done with some of the present forms of oscillograph.

While I have described a preferred embodiment of my invention, I do not limit myself to this embodiment, but seek in the appended claims to cover all embodiments which will be obvious to those skilled in the art and will not depart from the spirit of my invention.

What I claim as new and desire to secure by Letters Patent of the United States, is—

1. In an oscillograph, a magnet, a looped conductor normally passing through the field of said magnet, supports for said conductor and said magnet rigidly fastened to each other, a mirror secured to said conductor, and means for relatively displacing laterally the mirror and the magnet.

2. In an oscillograph, a magnet, a looped conductor normally passing through the field of said magnet, supports for said conductor and said magnet rigidly fastened to each other, means for resiliently holding the conductor, a mirror secured to the conductor, and means for relatively displacing laterally the mirror and the magnet.

3. In an oscillograph, a magnet, a winding therefor, a support for the magnet connected to one terminal of the winding, a looped conductor normally passing through the field of the magnet, a spring for resiliently holding said conductor, a support for the spring connected to the second terminal of the winding, a mirror secured to the conductor, and means for displacing relatively the conductor and the magnet.

4. In an oscillograph, a magnet, a support therefor, a looped conductor normally passing through the field of the magnet, supports for the ends of said conductor, terminals connected to said supports, a spring attached to the looped portion of the conductor resiliently holding the same, a mirror secured to the conductor, and means for relatively displacing laterally the conductor and the magnet.

5. In an oscillograph, a magnet, a support therefor, a conductor normally passing through the field of the magnet, a mirror secured to the conductor, a device adapted to push the conductor away from the magnet normally out of engagement with the conductor, and means for operating said device.

6. In an oscillograph, a magnet, a support therefor, a conductor normally passing through the field of the magnet, a mirror secured to the conductor, a collar surrounding the magnet support having a projection adapted to push the conductor away from the magnet, a spring normally holding the collar out of engagement with the conductor, and means adapted to move said collar against the action of said spring.

7. In an oscillograph, a substantially ring-shaped magnet, a support therefor, a looped conductor normally passing through the field of said magnet, a mirror secured to the conductor, means for resiliently holding said conductor, a collar surrounding the magnet support having a projection adapted to push the conductor away from the magnet, a spring normally holding the collar out of engagement with the conductor, and a screw passing through the magnet adapted to move the collar against the action of said spring.

8. An oscillograph comprising a containing vessel, a cover therefor, a magnet, a support therefor attached to the cover, a conductor normally passing through the field of the magnet, a mirror secured to the conductor, means for resiliently holding the conductor, and means for relatively displacing laterally the conductor and the magnet.

9. An oscillograph comprising a containing vessel, a damping liquid therein, a cover therefor, a magnet within the vessel secured to the cover, a winding for the magnet, a connection between the vessel and one end of the winding, a looped conductor normally passing through the field of the magnet, a mirror secured to the conductor, a spring for resiliently holding the conductor, and means for displacing relatively the conductor and the magnet to render the mirror accessible.

10. An oscillograph comprising a containing vessel, a cover therefor, a magnet within the vessel secured to the cover, a winding for the magnet, a connection between the vessel and one end of the winding, a terminal connected to the other end of the winding, a looped conductor normally passing through the field of the magnet, a mirror secured to the conductor, a spring for resiliently holding the conductor, a device adapted to push the conductor away from the magnet to render the mirror accessible normally out of engagement with the conductor, and means for operating said device.

11. An oscillograph comprising a substantially vertical tube, means for adjusting the position of said tube, a removable cover therefor, a substantially ring-shaped magnet, a support for the same attached to the cover, a winding for the magnet, a terminal fastened to the cover connected to one end of the winding, a looped conductor normally passing through the field of the magnet, supports for the ends of the conductor, terminals fastened to the cover connected to the supports, a mirror secured to the conductor, a window in the tube opposite the mirror, a spring for resiliently holding the conductor, a support for the same attached to the magnet support, a connection between the spring support and the second end of the magnet winding, a spring member attached to the support adapted to make contact with the tube, a collar surrounding the magnet support having a projection adapted to push the conductor away from the magnet, means for normally holding the projection out of engagement with the conductor, and means for causing said projection to engage the conductor.

12. An oscillograph comprising an electromagnet, a conductor passing through the field of said magnet, a mirror secured to said conductor, a circuit including a source of energy for energizing the magnet, and means for obtaining an indication of the movements of the mirror, means for completing said circuit automatically when said indications are being obtained and for opening said circuit after the indications have been obtained.

13. An oscillograph comprising an electromagnet, a conductor in operative relation therewith, a mirror secured to said conductor, a circuit including a source of energy for energizing the magnet, means for obtaining an indication of the movements of the mirror, and means in operative relation with said means for completing said circuit when said indications are being obtained and opening the circuit after said indications have been obtained.

In witness whereof, I have hereunto set my hand this first day of April, 1910.

JOHN THOS. DEMPSTER.

Witnesses:
 BENJAMIN B. HULL,
 HELEN ORFORD.